United States Patent [19]

Stearns et al.

[11] 4,310,732
[45] Jan. 12, 1982

[54] SOUND POWERED HEADSET

[75] Inventors: William J. Stearns, Shrewsbury; George C. Lison, Gardner, both of Mass.

[73] Assignee: David Clark Company Incorporated, Worcester, Mass.

[21] Appl. No.: 162,506

[22] Filed: Jun. 24, 1980

[51] Int. Cl.³ .............................................. H04M 1/05
[52] U.S. Cl. .................................................... 179/156 A
[58] Field of Search ............ 179/148 F, 156 R, 156 A

[56] References Cited

U.S. PATENT DOCUMENTS

| 1,835,792 | 12/1931 | Lum | 179/156 A |
| 3,030,627 | 4/1962 | Rehman et al. | 179/156 A |

FOREIGN PATENT DOCUMENTS

| 44247 | 10/1938 | Netherlands | 179/156 A |
| 1139718 | 1/1969 | United Kingdom | 179/156 A |

*Primary Examiner*—George G. Stellar
*Attorney, Agent, or Firm*—Thompson, Birch, Gauthier & Samuels

[57] ABSTRACT

A sound powered headset has a curved headband with stirrups mounted at its opposite ends for pivotal movement about first axes. Earphone assemblies are supported by the stirrups for pivotal movement about second axes extending transversely to the first axes. The headband is configured to operatively position the earphone assemblies over the user's ears. A microphone assembly is supported by tubular arm members which are connected to each of the earphone assemblies for rotation about a third axis extending transversely to the aforesaid first and second axes. The microphone assembly contains a known device for converting sound waves to electrical impulses and the earphone assemblies likewise contain known devices for converting electrical impulses to sound waves. The arm members are sufficiently rigid to maintain the microphone assembly spaced in front of the user's mouth when the earphone assemblies are operatively positioned. The arm members are also sufficiently flexible to permit limited positional adjustment of the microphone assembly. The microphone assembly and the earphone assemblies are electrically interconnected by conductor wires extending through the arm members.

4 Claims, 5 Drawing Figures

SOUND POWERED HEADSET

BACKGROUND OF THE INVENTION

This invention relates to a sound powered headset having a pair of earphone assemblies containing known devices for converting electrical impulses to sound waves, and a microphone assembly containing a similar device for converting sound waves to electrical impulses.

Headsets of this type are well known and widely used in a variety of applications, including military and industrial communication systems.

The earphone assemblies are easily and comfortably retained on a user's head by employing a curved resilient headband. However, because of its size and weight, the microphone assembly has presented mounting problems. In some cases, the microphone assembly has been supported on an arm extending upwardly from a chest plate. This arrangement has proved to be both uncomfortable and bothersome since the chest plate is worn separately from the headset and is attached to the user's body by belts, straps or the like. In other cases, the microphone assembly has been strapped directly to the user's face. Here again, however, this arrangement has proved to be uncomfortable and bothersome, particularly where there is a need to frequently remove the microphone assembly in order to communicate with normal voice contact. In still other cases, the microphone assembly has been mounted on one of the earphone assemblies, with a voice tube being used to convey sound waves from the user's mouth. While this arrangement is less bothersome and more comfortable than those previously discussed, the quality of transmission is impaired somewhat due to the remote positioning of the microphone assembly in relation to the user's mouth.

The aim of the present invention is to provide a sound powered headset with an integrally connected microphone assembly which is adjustably supported in front of and in spaced relationship relative to the user's mouth.

SUMMARY OF THE INVENTION

The present invention provides an improved sound powered headset having a curved resilient headband with stirrups mounted at its opposite ends for pivotal movement about first axes. The stirrups in turn support earphone assemblies for pivotal movement about second axes extending transversely relative to the first axes. The headband is appropriately configured to retain the earphone assemblies in operative positions over the user's ears. A microphone assembly is supported on the front side of the headset by a pair of curved arm members extending in cantilever fashion from the earphone assemblies. The earphone assemblies and the microphone assembly each contain conventional devices for converting sound waves to electrical impulses, or vice versa. The arm members are appropriately configured to support the microphone assembly in front of and in spaced relationship relative to the user's mouth. The arm members are also sufficiently flexible to permit adjustment of this spaced relationship.

Advantageously, the arm members consist of spirally wound metallic tubes which house the conductor wires used to electrically interconnect the earphone assemblies and the microphone assembly. This is advantageous in that it safeguards the conductor wires from any damage that might otherwise occur due to mishandling.

Preferably, the arm members are connected to the earphone assemblies for rotation about a third axis extending transversely relative to the aforesaid first and second axes. This allows the microphone assembly to be conveniently swung into and out of its use position. Preferably, the arm members are releasably fixed against rotation about the third axis in order to securely lock the microphone assembly in any selected position.

BRIEF DESCRIPTION OF THE DRAWINGS

A sound powered headset constructed in accordance with the present invention will now be described, by way of example, with reference to the accompanying drawings in which.

DESCRIPTION OF THE PREFERRED EMBODIMENT

Figure 1:
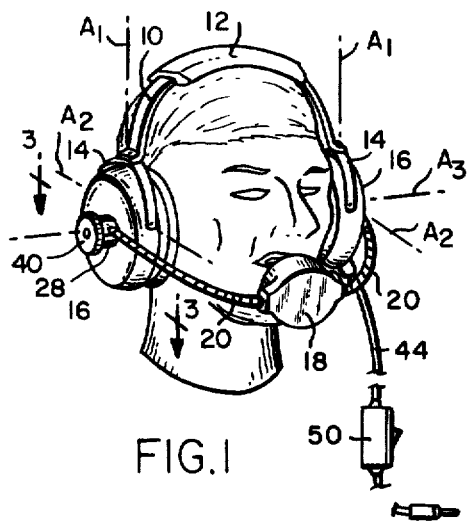
FIG. 1 is a perspective view of the headset as it appears on a user's head.

Referring now to the drawings, a headset assembly in accordance with the present invention is shown comprising a curved resilient headband 10 having a generally C-shaped configuration. The headband may if desired be cushioned by a pad 12.

A pair of stirrups 14 are mounted at opposite ends of the headband for pivotal movement about first axes $A_1$. Earphone assemblies 16 are supported by the stirrups for pivotal movement about second axes $A_2$ extending transversely relative to the first axes $A_1$. The headband 10 is appropriately configured to retain the earphone assemblies 16 in operative positions overlying the user's ears, as shown in the drawings.

Figure 2:
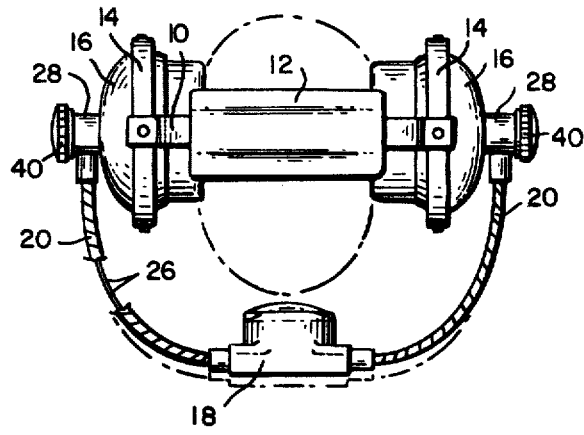
FIG. 2 is a horizontal plan view of the headset.
Figure 5:
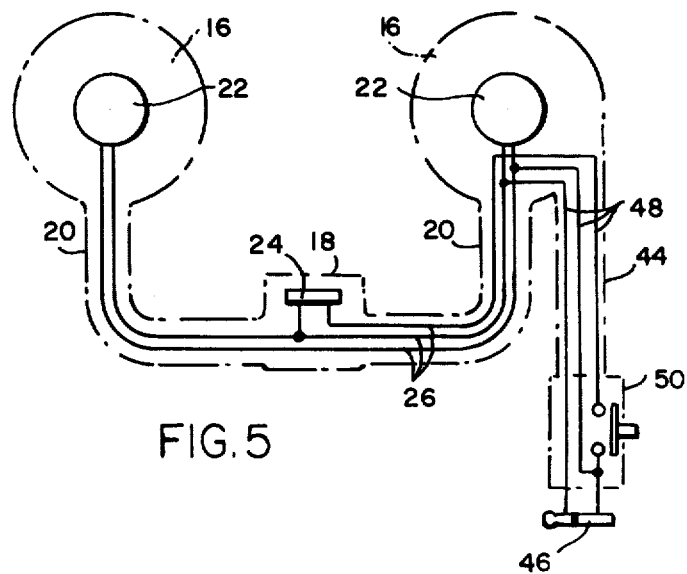
FIG. 5 is a schematic diagram showing how the earphone assemblies and microphone assembly are electrically connected to each other.

A microphone assembly 18 is supported on the front side of the headset by a pair of curved arm members 20 extending forwardly from the earphone assemblies 16. The arm members have sufficient rigidity so as to maintain the microphone assembly in front of and in spaced relationship relative to the user's mouth when the earphone assemblies are operatively positioned over the user's ears. The arm members 20 are also sufficiently flexible so as to allow for some limited positional adjustment of the microphone assembly, as shown for example by the dot-dash lines in FIG. 2. The arm members 20 preferably consist of metallic spirally wound tubes of the type commonly employed to adjustably support various electrical devices. The earphone assemblies 16 contain well known devices (schematically depicted at 22 in FIG. 5) for converting electrical impulses to sound waves. Likewise, the microphone assembly 18 contains a known device 24 for converting sound waves to electrical impulses. The devices 16, 18 are electrically interconnected by conductor wires indicated typically at 26. These wires extend through and are shielded from damage by the tubular arm members 20.

Figure 3:
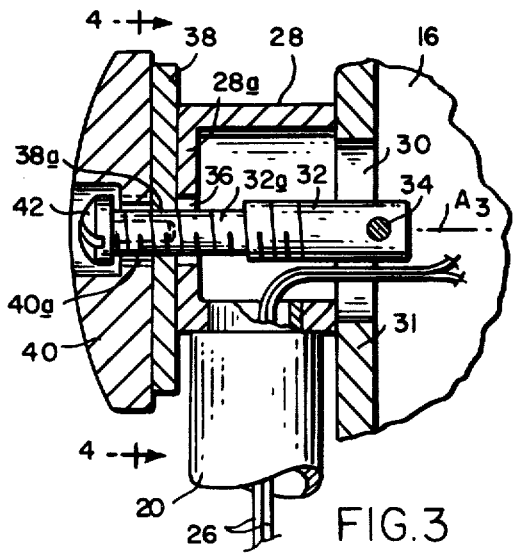
FIG. 3 is a sectional view on a greatly enlarged scale taken along line 3—3 of FIG. 1.
Figure 4:
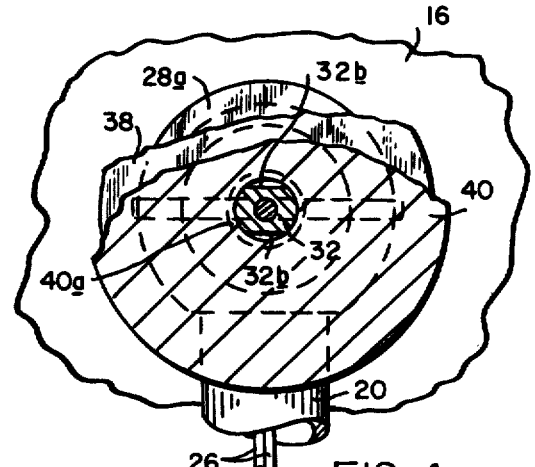
FIG. 4 is a sectional view on line 4—4 of FIG. 3, with portions broken away.

As can be best seen by reference to FIGS. 3 and 4, the arm members 20 are secured by any convenient means to small cylindrical caps 28. The open ends of the caps overlie openings 30 in the side walls 31 of the earphone assemblies. Short threaded shafts 32 extend into the openings 30 where they are somewhat loosely held by cross pins 34. The shafts have end sections 32a with flat surfaces 32b (see FIG. 4) where the threads have been ground away. Sections 32a protrude through openings 36 in the cap end walls 28a. Washers 38 are received on end sections 32a and abut the external faces of the cap end walls 28a. The washers are fixed against rotation relative to the shaft end sections 32a by virtue of their central holes 38a having flat surfaces in engagement with the flat shaft surfaces 32b. Knobs 40 are threaded as at 40a onto the shaft end sections 32a. Removal of the knobs is prevented by screws 42 threaded into the ends of shaft end sections 32a. The threaded shafts 32 define a third axis $A_3$ which extends transversely to the axes $A_1$, $A_2$ and about which the arms 20 can be pivoted when the knobs 40 are loosened to allow free rotation of the caps 28. When the knobs are tightened, the caps 28 are frictionally gripped and fixed against rotation between the washers 38 and earphone assembly side walls 31.

As is conventional, a cord 44 leads from one of the earphone assemblies 16 to a connector plug 46. The cord 44 contains conductor wires 48 connected to the wires 26. If desired, a "push to talk" switch may be wired into the cord 44.

It will thus be seen that the arm members 20 provide a comfortable and convenient means for supporting the microphone assembly 18 at an ideal location spaced slightly in front of the user's mouth. Rotation of the arm members about axis $A_3$ enables the user to easily shift the microphone assembly into and out of its use position. All of this is made possible without having to resort to extra garments and/or cumbersome uncomfortable straps, buckles and the like. By supporting the microphone assembly 18 between two arms 20, an evenly balanced assembly is provided which further contributes to the comfort of the wearer. By shielding the conductor wires within the arms 20, the chance of their being damaged through misuse is decreased considerably.

We claim:

1. A sound powered headset comprising:
   a curved headband,
   stirrups mounted at opposite ends of said headband for pivotal movement about first axes,
   earphone assemblies supported by said stirrups for pivotal movement about second axes extending transversely to said first axes, each earphone assembly conntaining means for converting electrical impulses to sound waves, said headband and stirrups being configured to operatively position said earphone assemblies over the ears of a user,
   a microphone assembly, means contained within said microphone assembly for converting sound waves to electrical impulses,
   arm members extending from each of said earphone assemblies for supporting said microphone in front of and in spaced relationship relative to the user's mouth when said earphone assemblies are operatively positioned, said arm members being sufficiently flexible to permit adjustment of the aforesaid spaced relationship, and
   conductor means electrically connecting said microphone assembly to said earphone assemblies.

2. The sound powered headset of claim 1 wherein said arm members are connected to said earphone assemblies for rotation about a third axis extending transversely relative to said first and second axes.

3. The sound powered headset of claim 2 further comprising means for releasably fixing said arm members against rotation about said third axes.

4. The sound powered headset of claim 1 wherein said arm members have a tubular configuration, and wherein said conductor means are contained within said tubular members.

* * * * *